United States Patent
Meschini

(10) Patent No.: US 11,505,339 B2
(45) Date of Patent: Nov. 22, 2022

(54) NON-EXPLOSIVE RELEASE MECHANISM BASED ON ELECTROMAGNETIC INDUCTION MELTING

(71) Applicant: Thales Alenia Space Italia S.p.A. Con Unico Socio, Rome (IT)

(72) Inventor: Alberto Meschini, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 1164 days.

(21) Appl. No.: 16/069,832

(22) PCT Filed: Dec. 30, 2016

(86) PCT No.: PCT/EP2016/082947
§ 371 (c)(1),
(2) Date: Jul. 12, 2018

(87) PCT Pub. No.: WO2017/121629
PCT Pub. Date: Jul. 20, 2017

(65) Prior Publication Data
US 2019/0031374 A1    Jan. 31, 2019

(30) Foreign Application Priority Data
Jan. 15, 2016  (IT) .................... 102016000003469

(51) Int. Cl.
*B23K 1/00* (2006.01)
*B64G 1/64* (2006.01)
(Continued)

(52) U.S. Cl.
CPC .............. *B64G 1/645* (2013.01); *B23K 1/002* (2013.01); *B23K 1/005* (2013.01); *B23K 3/0475* (2013.01);
(Continued)

(58) Field of Classification Search
CPC ......... B23K 1/018; B23K 1/002; B23K 3/087
See application file for complete search history.

(56) References Cited

U.S. PATENT DOCUMENTS 6,528,771 B1 * 3/2003 Matsen ............... H05B 6/105
219/634
7,621,437 B2 * 11/2009 Nansen ................ B64C 1/06
228/262.72
(Continued)

FOREIGN PATENT DOCUMENTS

FR   2824009    10/2002
WO   8402098    6/1984

OTHER PUBLICATIONS

PCT International Search Report and Written Opinion for PCT/EP2016/082947 dated Mar. 24, 2017.

*Primary Examiner* — Erin B Saad
(74) *Attorney, Agent, or Firm* — McCarter & English, LLP

(57) ABSTRACT

The present invention relates to a release system (1, 2, 3, 4, 5), that includes a segmented structural element (10) comprising: a first segment (10a) designed to be coupled to a first structure, a second segment (10b) designed to be coupled to a second structure, and a solder joint (11) joining respective ends of said first (10a) and second (10b) segments, thus holding down the first and second structures with respect to one another; wherein said solder joint (11) is electromagnetically heatable and includes a solder alloy having a predefined melting temperature. The release system (1, 2, 3, 4, 5) is characterized by further including magnetic field generating means (13, PW1, PW2, PW3, PW4, PW5) configured to, upon reception of a release command, generate a time-varying magnetic field through the solder joint (11) such that to cause heating thereof up to the predefined melting temperature of the solder alloy, thereby causing
(Continued)

melting of said solder alloy; whereby separation of the first (10*a*) and second (10*b*) segments is caused, thus enabling release of the first and second structures from one another.

20 Claims, 6 Drawing Sheets

(51) Int. Cl.
  *B23K 1/002* (2006.01)
  *B62D 33/06* (2006.01)
  *B62D 21/06* (2006.01)
  *B23K 1/005* (2006.01)
  *B23K 3/047* (2006.01)
  *B64G 1/10* (2006.01)

(52) U.S. Cl.
  CPC ............ *B62D 21/06* (2013.01); *B62D 33/06* (2013.01); *B62D 33/0617* (2013.01); *B64G 1/10* (2013.01)

(56) References Cited

U.S. PATENT DOCUMENTS

| | | |
|---|---|---|
| 2004/0200550 A1* | 10/2004 | Pfaffmann ............. B21D 37/16 148/526 |
| 2006/0180705 A1 | 8/2006 | Nansen et al. |
| 2010/0257983 A1 | 10/2010 | Jordan et al. |
| 2015/0028021 A1 | 1/2015 | Beckel et al. |
| 2016/0169646 A1 | 6/2016 | Comtesse et al. |
| 2019/0031374 A1* | 1/2019 | Meschini ............... B64G 1/645 |

* cited by examiner

NON-EXPLOSIVE RELEASE MECHANISM BASED ON ELECTROMAGNETIC INDUCTION MELTING

CROSS-REFERENCE TO RELATED APPLICATIONS

This application is a 35 U.S.C. § 371 National Stage filing of International Application No. PCT/EP2016/082947, filed on Dec. 30, 2016, which claims priority to Italian Patent Application 102016000003469, filed on Jan. 15, 2016.

TECHNICAL FIELD OF THE INVENTION

The present invention relates to a non-explosive release actuator that finds advantageous, but non-exclusive, application for aerospace Hold-down and Release Mechanisms (HRMs). Moreover, the present invention can be advantageously exploited also for fragmentation of end-of-life space systems and for release of a space system from a launch vehicle (or launcher).

STATE OF THE ART

As is known, space systems (such as satellites and spacecrafts) typically have deployable appendages (such as antennas, solar arrays, booms, supports, instruments, etc.) that are held stowed for launch in order to fit into the available launcher volume and to survive the launch mechanical environment, and that are then released and deployed in orbit for operation.

In order to achieve these functions, Hold-down and Release Mechanisms (HRMs) are commonly used, which securely and strongly connect and hold down the deployable appendages of a space system during launch, and which release said deployable appendages upon reception of a command signal, in particular when the space system is in orbit and has reached a predefined position in outer space.

Currently, the most extensively used HRMs are based on pyrotechnics, such as pyro-cutters, pyrotechnic nuts, pyrotechnic bolt/wire/cable cutters, etc.; for example, some of the HRMs currently used in aerospace sector exploit a pyro-cutter to cut a preloaded tie-rod.

As is broadly known, pyrotechnic HRMs, despite their huge heritage and high reliability, present severe drawbacks. In particular, pyrotechnic HRMs produce shocks that can be extremely dangerous for integrity of delicate equipment. This shock issue can be mitigated by dedicated design at HRM level, but, nevertheless, pyrotechnic HRMs can still produce hazardous shocks. Moreover, in order to try to (further) mitigate this shock issue, relevant electronic units are generally over-tested, thereby resulting in highly expensive test campaigns. However, despite this over-testing, unit failures are still quite recurrent. Additionally, manipulation, storage and operation of pyrotechnic HRMs can be intrinsically hazardous.

The current trend in aerospace sector is towards space systems, in particular satellites, that are smaller, lighter, more complex, more versatile and with more sensitive on-board instrumentation. The combination of all these factors leads to the need to drastically reduce shocks generated by the HRMs and, thence, to use non-explosive HRMs. In addition, the trend to move away from pyrotechnic systems is growing also due to the fact that substantial cost savings can be achieved with the avoidance of safety-related costs currently involved by the use of pyrotechnic HRMs. In this connection, it is worth also noting that in the context of the "Horizon 2020" research and innovation programme of the European Union, the European Commission (EC), European Space Agency (ESA) and European Defense Agency (EDA) have drawn up a list of urgent actions for critical space technologies for European strategic non-dependence, which includes also the need for non-explosive hold-down and release actuators intended to completely supersede the pyrotechnic ones. In particular, said non-explosive hold-down and release actuators shall meet ultralow shock requirements (<300 g) that cannot be fulfilled by any pyrotechnic actuator, shall cover tightening tension and temperature ranges that are highly demanding (respectively, [0N,150 kN] and [−130° C.,+150° C.]), and shall have a competitive price.

Therefore, many in-depth researches have been carried out in order to develop non-explosive actuators for HRMs, such as:

actuators based on the use of Shape Memory Alloys (SMAs), wherein said SMAs change their geometrical shape (length, angle, etc.) upon reaching their transition temperature, thereby actuating the release of a mechanical joint (for example by breaking a joining bolt, or by changing the geometry of an element maintaining a joint so as to release a fastener or a retainer, etc.); and actuators (such as separation/split spool devices) based on the use of fuse wires, wherein said fuse wires keep mechanical elements preloaded (such as fuse wires acting as locking members that fasten tensioned members, such as preloaded coil springs, keeping together split spools), and, when necessary, are heated up to fuse or self-destruct, thereby triggering the release mechanism (for example, a fuse wire, upon fusing or self-destructing, releases a preloaded coil spring which, in cascade, releases a split spool).

An example of non-explosive, SMA-based HRM is provided in the paper by Vazquez J. and Bueno I. entitled "*Non explosive low shock reusable 20 kN hold-down release actuator*" (Proceedings of the 9th European Space Mechanisms and Tribology Symposium, 19-21 Sep. 2001, Liège, Belgium—ESA SP-480, pages 131-135, September 2001). In particular, this paper discloses a mechanism based on a segmented nut kept in position by a preloaded mechanism, which is clamped with a latch than can be triggered by a wire of SMA.

A further example of non-explosive, SMA-based HRM is provided also in the paper by Nava N. et al. entitled "*A novel hold-down and release mechanism for non-explosive actuators based on SMA technology*" (Proceedings of the 16th European Space Mechanisms and Tribology Symposium, 23-25 Sep. 2015, Bilbao, Spain—ESA SP-737, September 2015). In particular, this paper discloses a HRM triggered by a SMA fibre that can pull with about 70 N of force. Since the HRM handles high external forces (for example preloads of 35 KN and pin stroke forces of 500 N), the decomposition of these loads is necessary to perform the complete triggering operation. In detail, the mechanism proposed in said paper is mainly composed of:

a trigger part, called Crown, pulled by a SMA wire for operation;

spheres that support the mechanical interfaces (pin or rod and nut); and spheres for decomposing the external forces down to a force that SMA can handle.

Instead, an example of non-explosive HRM based on the use of fuse wires is provided in US 2012/0293294 A1, that discloses an apparatus comprising:
- a restraint release mechanism comprising one or more restraint release arms;
- a redundant release device comprising a segmented spool having a plurality of segments that are constrained from separating by spring restraint tape releasably secured to the restraint release arms;
- a redundant fuse wire assembly coupled to the redundant release device and comprising
   - a primary positive contact,
   - a redundant positive contact,
   - a common negative contact,
   - a primary fuse wire connected between the primary positive contact and the common negative contact that wraps around the redundant positive contact and the restraint release arms, and
   - a redundant fuse wire connected between the redundant positive contact and the common negative contact that wraps around the primary positive contact and the restraint release arms; and
- an electrical power source coupled to the redundant fuse wire assembly for heating and severing the fuse wires.

SMA-based HRMs suffer from severe tightening tension and temperature limitations, while split spool devices based on the use of fuse wires are subject to severe export control restrictions.

Moreover, both said technologies suffer from reliability issues due to mechanical complexity of the relevant hold-down and release systems.

Additionally, WO 2015/014943 A1 relates to a method and device for connecting and separating two elements, with connecting plates, suitable for separating stages of a launcher. In particular, the method and the device according to WO 2015/014943 A1 enable the linear separation of two elements attached to each other, through two respective connecting surfaces of these two elements. A connecting layer is placed between both connecting parts. Thermite is used to melt this connecting layer. The thermite can be placed on the other side of the first connecting part towards the first element, a heat protecting plate completing this assembly. The thermite can also be placed in grooves provided on the connecting surface of the second connecting plate to be directly in contact with the connecting layer.

OBJECT AND SUMMARY OF THE INVENTION

Object of the present invention is that of providing a non-explosive HRM that is:
- alternative to those ones based on the use of SMAs and fuse wires so that to avoid the aforesaid relevant drawbacks;
- alternative to that one according to WO 2015/014943 A1 so that to be more efficient and more reliable; and
- such that to meet the aforesaid ultralow shock requirements (i.e., <300 g), cover the aforesaid highly demanding ranges of tightening tensions and temperatures (i.e., respectively, [0 N,150 kN] and [−130° C.,+150° C.]), and have a competitive price.

This and other objects are achieved by the present invention in that it relates to a release system, as defined in the appended claims.

In particular, the release system according to the present invention includes a segmented structural element comprising:
- a first segment designed to be coupled to a first structure;
- a second segment designed to be coupled to a second structure; and
- a solder joint joining respective ends of said first and second segments, thus holding down the first and second structures with respect to one another; wherein said solder joint is electromagnetically heatable and includes a solder alloy having a predefined melting temperature.

The release system according to the present invention is characterized by further including magnetic field generating means configured to, upon reception of a release command, generate a time-varying magnetic field through the solder joint such that to cause heating thereof up to the predefined melting temperature of the solder alloy, thereby causing melting of said solder alloy; whereby separation of the first and second segments is caused, thus enabling release of the first and second structures from one another.

BRIEF DESCRIPTION OF THE DRAWINGS

For a better understanding of the present invention, preferred embodiments, which are intended purely by way of non-limiting examples, will now be described with reference to the attached drawings (all not to scale), wherein.

DETAILED DESCRIPTION OF PREFERRED EMBODIMENTS OF THE INVENTION

Figure 1:
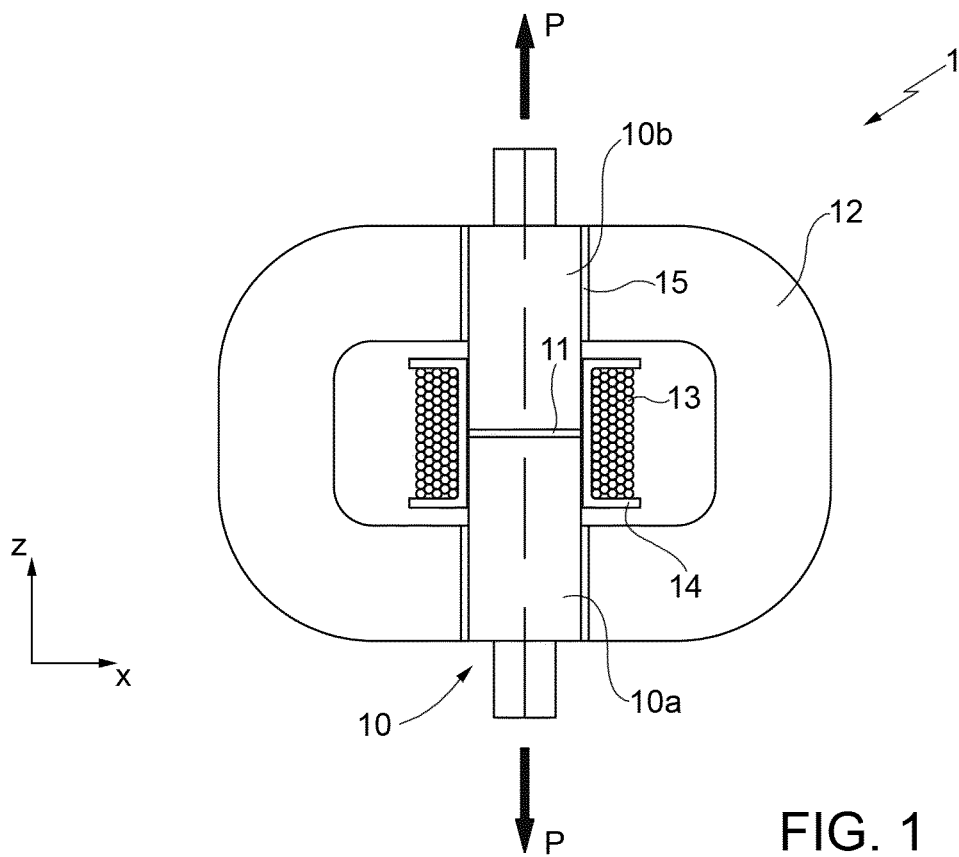
FIGS. 1-5 illustrate a release system according to a first preferred embodiment of the present invention.

The following discussion is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope consistent with the principles and features disclosed herein and defined in the appended claims.

The present invention relates to a non-explosive release system including a segmented structural element (for example, in the form of a segmented tie rod), that comprises:
- a first segment designed to be coupled to a first structure (conveniently, a satellite or a spacecraft);
- a second segment designed to be coupled to a second structure (conveniently, a deployable appendage or apparatus of said satellite/spacecraft); and
- a solder joint joining respective ends of said first and second segments, thus securely holding down the first and second structures with respect to one another; wherein said solder joint is electromagnetically heatable and includes a solder alloy (preferably an eutectic alloy) having a predefined melting temperature Moreover, the non-explosive release system further includes magnetic field generating means configured to, upon reception of a release command, generate a time-varying magnetic field through the solder joint such that to cause heating thereof up to the predefined melting temperature of the solder alloy, thereby causing melting of said solder alloy; whereby separation of the first and second segments is caused, thus enabling release of the first and second structures from one another.

Conveniently, the solder alloy is a gold or silver alloy.

Preferably, the predefined melting temperature of the solder alloy is comprised between 200° C. and 400° C., and said solder alloy is characterized by a mechanical strength higher than 100 MPa.

Preferably, the solder alloy is electromagnetically heatable, the solder joint is made up of said solder alloy, and the magnetic field generating means are configured to generate a time-varying magnetic field through the solder joint such that to induce eddy currents in said solder alloy (according to Faraday's law of induction), thereby causing heating thereof up to said predefined melting temperature.

Alternatively, the solder joint further includes a metal (preferably copper), and the magnetic field generating means are configured to generate a time-varying magnetic field through the solder joint such that to induce eddy currents in said metal (according to Faraday's law of induction), thereby causing heating thereof; whereby the heating of said metal causes the solder alloy to heat up to its predefined melting temperature. Conveniently, the solder joint includes:
two layers made of the solder alloy; and
a layer that is made of said metal and is interposed between said two layers made of the solder alloy.

Preferably, the segmented structural element extends mainly along a longitudinal axis, the solder joint has a substantially uniform cross-sectional size orthogonally to said longitudinal axis and a thickness along said longitudinal axis quite smaller than said cross-sectional size, and the magnetic field generating means are designed to generate a time-varying magnetic field extending through the solder joint substantially parallelly to said longitudinal axis.

The present invention can be advantageously exploited to:
hold down and release deployable appendages/apparatuses of a satellite/spacecraft (whereby the aforesaid first structure is a satellite/spacecraft and the aforesaid second structure is a deployable appendage/apparatus of said satellite/spacecraft);
achieve fragmentation of end-of-life space systems (whereby the aforesaid first and second structures are, respectively, a first component/apparatus and a second component/apparatus of one and the same space system, such as a satellite or spacecraft or launch vehicle designed to fragment before or during re-entry into the Earth's atmosphere); and
release a satellite or a spacecraft from a launch vehicle (whereby the aforesaid first and second structures are, respectively, a launcher and a satellite/spacecraft carried by the latter).

For the sake of description simplicity and, thence, without losing generality, in the following preferred embodiments of the present invention will be described in detail by making explicit reference to a segmented structural element in the form of a segmented tie rod used to hold down and release deployable appendages/apparatuses of satellites/spacecrafts.

For a better understanding of the present invention, working principle thereof can be compared to a transformer whose primary winding, supplied with an AC voltage, induces a magnetic flux into a magnetic circuit made up of the segmented tie rod and an external casing housing said segmented tie rod.

The general equation that applies to said magnetic circuit is:

$$R \, \Phi = N \, I,$$

where R denotes the reluctance of the magnetic circuit, $\Phi$ denotes the induced magnetic flux, N denotes the number of turns of the primary winding, and I denotes the current in the primary winding.

Since the segmented tie rod comprises two segments soldered to one another with a conductive solder alloy which exhibits an effective diamagnetism when experiencing a time-varying magnetic field, the magnetic flux induces eddy currents in the solder joint according to Faraday's law of induction, which eddy currents produce ohmic losses, namely Joule heating, thus increasing the temperature of the solder alloy up to the melting temperature thereof.

Once the melting temperature is reached, the tie rod (which is also conveniently subjected to mechanical preload and to an extractor spring force) becomes separated into two segments, thus achieving release.

As previously explained, the use of fuse elements to achieve the separation of mechanical elements has been already exploited in the past. However, from the foregoing it is absolutely clear that the system according to the present invention is completely different from the ones currently known.

In particular, it is worth noting that one of the (several) main differences between the present invention and the current actuators based on the use of fuse elements is due to the fact that, according to the present invention, the solder joint carries directly the preload and the external extraction forces, while in the other actuators the fuse elements do not carry directly the preload, neither the external extraction forces.

Moreover, from a reliability point of view, the correct operation of the present invention is based on the success of only one event (i.e., the magnetically-induced melting of the solder joint), while for the split spool devices the correct operation is based on the success of at least two events and, additionally, the parts to be released are subjected to frictional relative motion.

Furthermore, it is worth noting also that the mechanical complexity of the present invention is much lower than all the other existing non-explosive release solutions.

For a better understanding of the present invention, FIG. 1 shows a cross-section, in a Cartesian reference plane zx, of a first release system (denoted as a whole by 1) according to a first preferred embodiment of the present invention. Said first release system 1 includes a segmented tie rod 10 that extends mainly parallelly to axis z and comprises a first segment 10a and a second segment 10b, that are soldered to one another by means of a solder alloy forming a solder joint 11 between said first and second segments 10a and 10b.

The first segment 10a can be conveniently preloaded by being either securely fixed to an external carrying structure (not shown in FIG. 1), such as a satellite or spacecraft, or coupled to one or more preloaded extractor springs (not shown in FIG. 1). Additionally, the second segment 10b can be conveniently preloaded by being coupled to one or more preloaded extractor springs (not shown in FIG. 1). The preload of the first and second segments 10a and 10b results in opposite forces P exerted on said first and second segments 10a and 10b.

Moreover, the first release system 1 further includes:
an external casing 12, that is a hollow soft-magnetic casing housing the segmented tie rod 10; and
a coil or solenoid 13, that comprises several metal windings, such as several copper windings, and is carried by a coil carrier 14 (conveniently made of dielectric material) so as to be wound around a middle portion of the segmented tie rod 10, which middle portion includes the solder joint 11.

As previously explained, the external casing 12 and the segmented tie rod 10 can be "seen" as a magnetic circuit of a transformer.

This magnetic circuit presents three discontinuities, wherein:

a first discontinuity is between the first segment 10a and the second segment 10b of the segmented tie rod 10, that is the solder joint 11, which is "seen" by a magnetic flux generated by the coil 13 as a magnetic discontinuity since the solder alloy is diamagnetic (the thickness of the solder joint 11 parallelly to the axis z being quite small so that the magnetic flux can pass through it without significant dispersion); and the other two discontinuities are air gaps 15 present between the external casing 12 and, respectively, the first segment 10a and the second segment 10b of the segmented tie rod 10 (said air gaps 15 being required for the tie rod insertion during an integration phase and for the tie rod segment(s) extraction after the release).

All the above discontinuities are the major contributors to the whole reluctance of the magnetic circuit.

The coil 13 is supplied by an AC generator (not shown in FIG. 1) with an AC electric signal having predefined frequency and amplitude, and thus generates a primary magnetic field. In particular, since the coil 13 (i.e., the primary winding of the transformer) is fed with an AC electric signal, a time-varying magnetic field is produced thus generating magnetic induction into the magnetic circuit.

Figure 2:
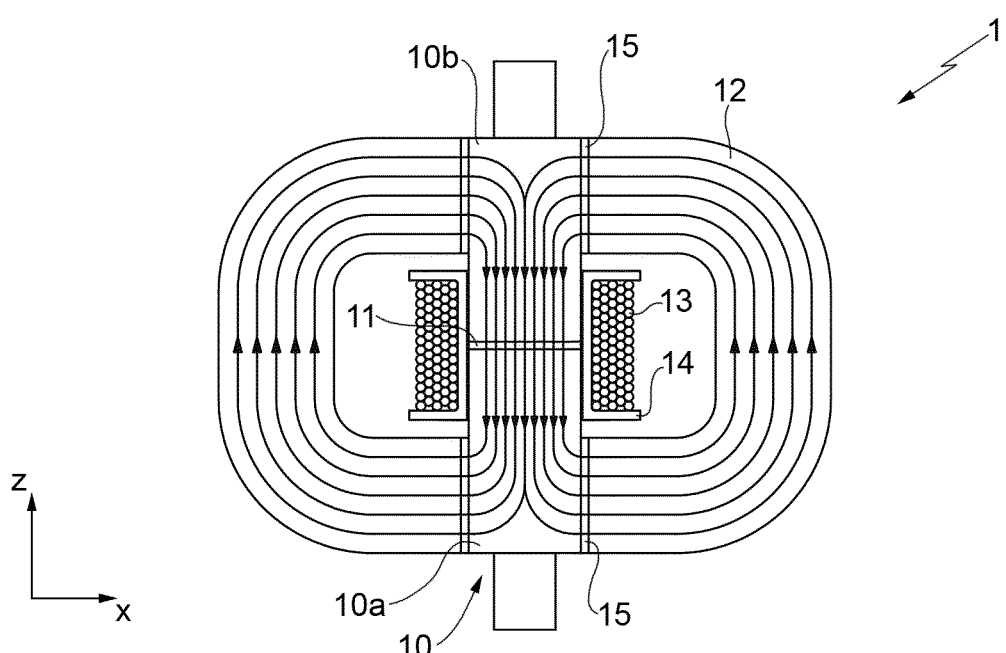

In this respect, FIG. 2 shows the same cross-section of the first release system 1 as FIG. 1, additionally illustrating flux lines of the magnetic flux generated by the coil 13. Moreover, FIGS. 3 and 4 show a cross-section of the solder joint 11 parallelly to axis x (namely, in a Cartesian reference plane xy orthogonal to the Cartesian reference plane zx) and illustrate, respectively, the flux lines of the magnetic flux generated by the coil 13 and eddy currents induced by said magnetic flux.

Figure 3:
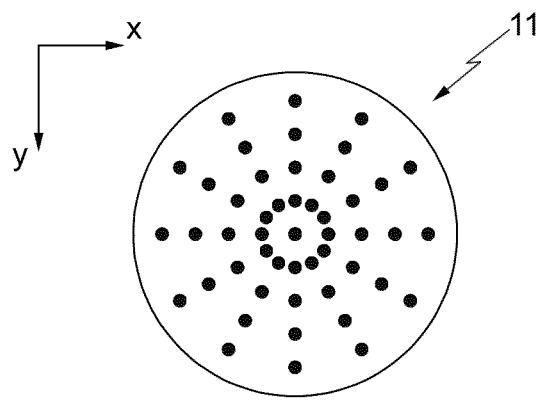
Figure 4:
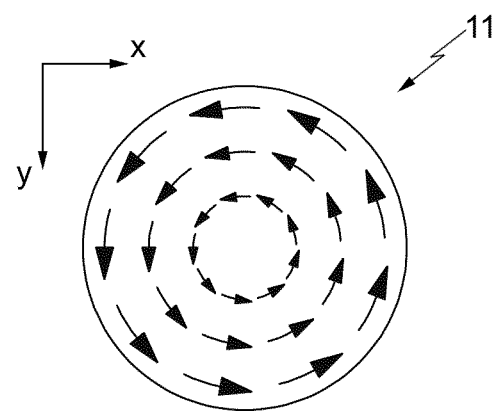

As shown in FIGS. 2-4, the magnetic flux generated by the coil 13 is normal to the cross section of the solder joint 11 and induces planar eddy currents that generate a counter flux opposite to the primary flux generated by the coil 13.

The magnetic induction is substantially constant with the thickness of the solder joint 11, since it is quite small with respect to the cross-sectional size and also to the skin depth penetration at the predefined operating frequency.

The eddy currents induced by the magnetic flux generated by the coil 13 into the solder joint 11 can be considered as the secondary winding of the transformer.

Conveniently, the solder joint is made of a high electrical conductivity alloy (for example, a silver and/or gold alloy), since ohmic losses are proportional to the material conductivity.

The melting temperature of the solder alloy is reasonably low (in particular, conveniently comprised between 200° C. and 400° C.). Therefore, an eutectic alloy or an alloy with low melting temperature is preferably used. Moreover, the solder alloy is able also to guarantee the capability of the solder joint 11 to carry the preload with adequate margins.

Some solder alloys preferably exploitable according to the present invention are listed in the following table, which reports also respective melting temperatures and mechanical strengths, and whether they are eutectic.

TABLE

| Melting temperature [° C.] | Composition by mass [%] | Eutectic | Mechanical strength [MPa] |
|---|---|---|---|
| 233 | 65.0Sn/25.0Ag/10.0Sb | No | 117 |
| 280 | 80.0Au/20.0Sn | Yes | 276 |
| 356 | 88.0Au/12.0Ge | Yes | 185 |
| 363 | 96.8Au/3.2Si | Yes | 255 |

In summary, the solder joint 11 has the function of:

providing mechanical strength;

supporting eddy currents and generating dissipation power; and melting down at a given low temperature.

Conveniently, an optional joint configuration provides for a highly electrically conductive thin metallic layer or foil (preferably made of pure copper) to be used in addition to the aforesaid solder materials. In this case, the tie rod can conveniently include from the bottom upwards:

the lower part of the tie rod (i.e., the aforesaid first segment 10a);

a first solder joint formed by one of the aforesaid solder alloys;

a metal foil or layer (for example, with a thickness of 0.1-0.5 mm), preferably made of copper;

a second solder joint formed by one of the aforesaid solder alloys; and the upper part of the tie rod (i.e., the aforesaid second segment 10b).

With this alternative solution it is possible to distinguish the functions of the first and second solder joints and of the metal foil or layer as follows:

the first and second solder joints provide mechanical strength and melt down at a given low temperature;

the metal foil or layer supports eddy currents and generates power to heat the solder joints up to the melting thereof.

With this optional configuration it is possible to control directly the dissipated power, since it is proportional to the square of the thickness of the metal foil or layer. In this respect, the use of copper is particularly advantageous, since copper has both high electrical conductivity and high mechanical strength (for example, also silver could be used, since it has a slightly higher electrical conductivity than copper; but silver has lower mechanical strength than copper, so the latter is preferable).

Preferably, the segmented tie rod 10 and, more preferably, also the external casing 12 are made of a soft magnetic alloy in order to reduce the reluctance of the magnetic circuit and, thence, maximize the magnetic flux which generates the eddy currents in the solder joint and relevant ohmic losses. More preferably, said soft magnetic alloy includes pure iron (such as ARMCO® pure iron), or is a silicon-iron alloy (conveniently with 1.0-4.0% Si), or is a cobalt-iron alloy (conveniently with up to 50% Co)

Figure 5:
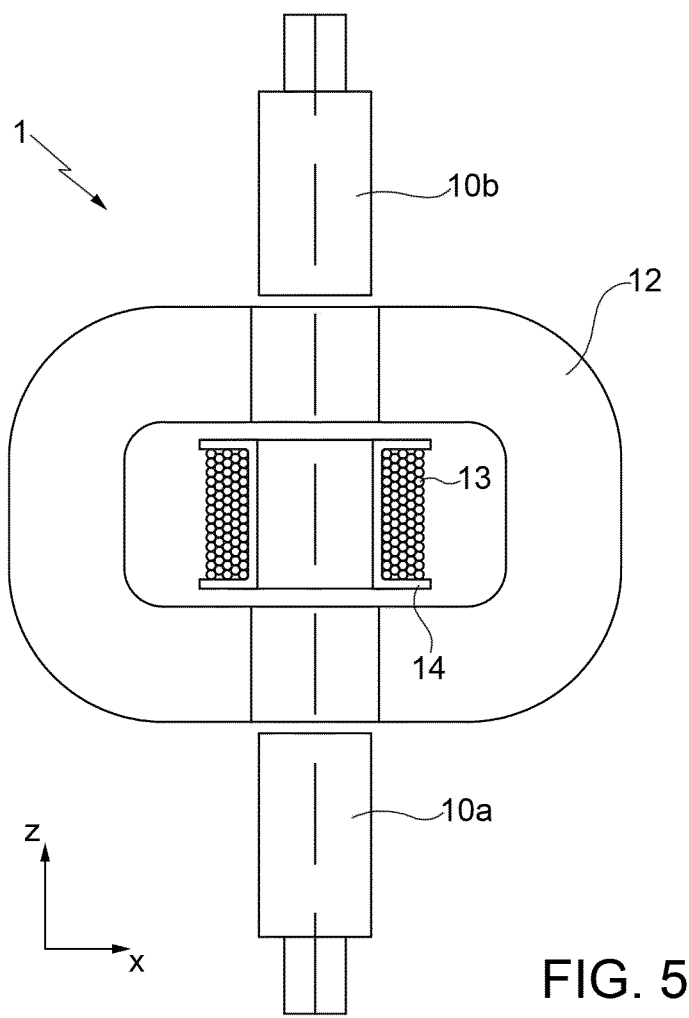

Furthermore, FIG. 5 shows a cross-section, in the Cartesian reference plane zx, of the first release system 1 after the solder alloy forming the solder joint 11 has melted and with reference to the case in which both the first and second segments 10a and 10b of the segmented tie rod 10 are coupled to preloaded extractor springs (not shown in FIG. 5). In particular, as shown in FIG. 5, said first and second segments 10a and 10b are released and then separated from one another as a consequence of the melting of the solder alloy forming the solder joint 11 and of the pulling forces exerted by the preloaded extractor springs.

Figure 6:
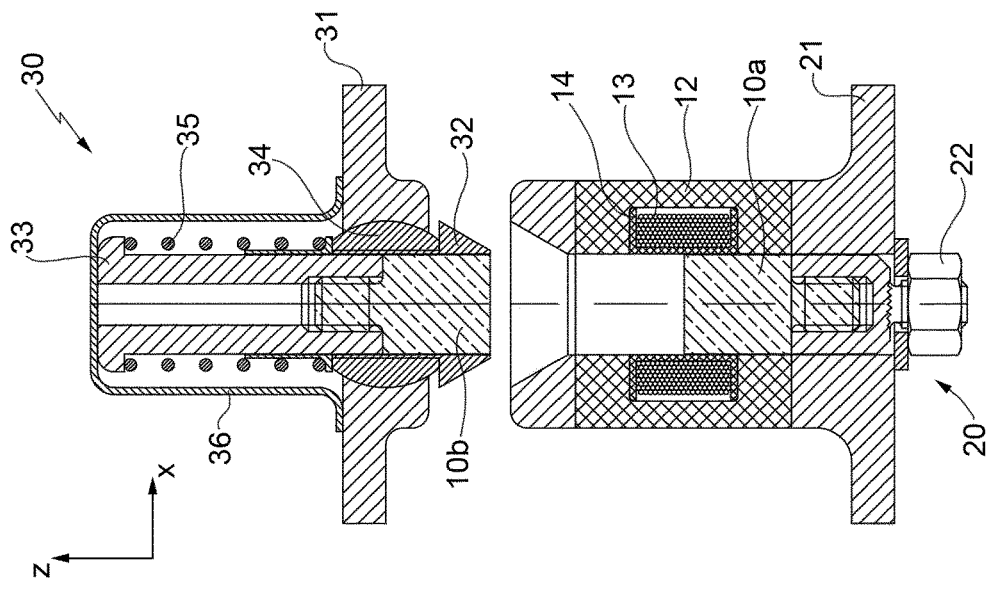
FIGS. 6-8 illustrate an example of use of the release system according to said first preferred embodiment of the present invention in a hold-down and release mechanism for a deployable antenna of a satellite.
Figure 7:
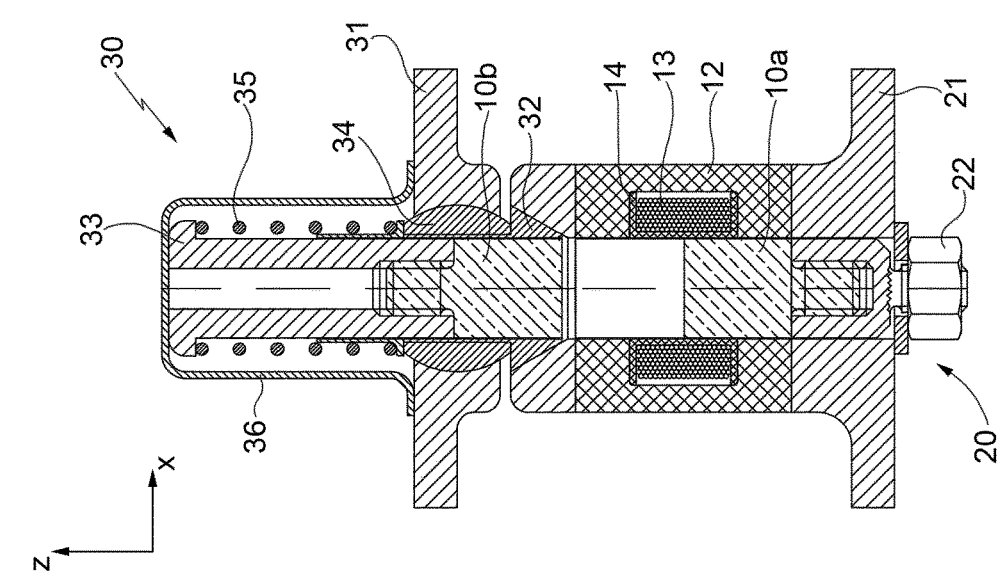
Figure 8:
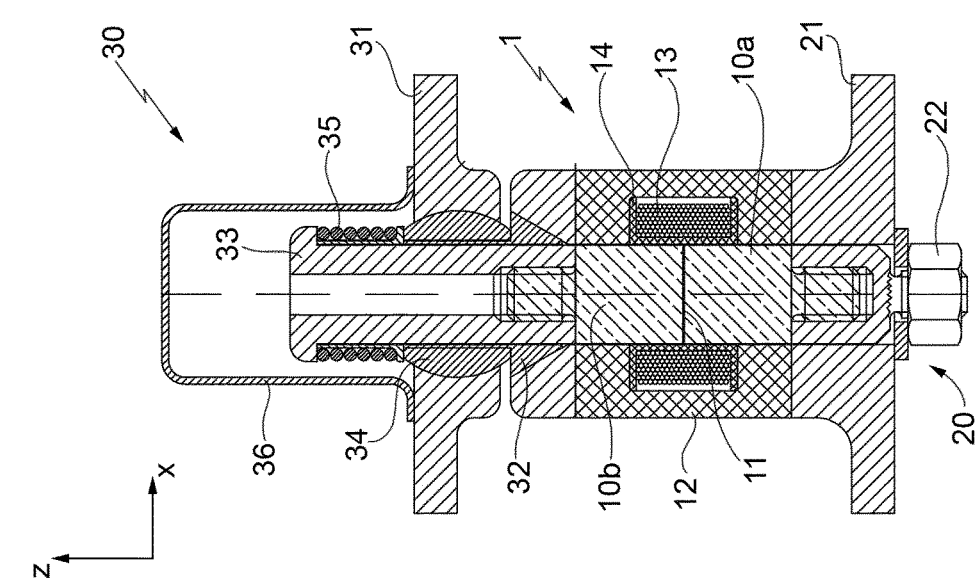

FIGS. 6-8 are cross-sectional views in the Cartesian reference plane zx and illustrate an example of use of the first release system 1 in a HRM for a deployable antenna of a satellite.

In particular, in the example shown in FIGS. 6-8 the first release system 1 is coupled to:
- a satellite (not shown in FIGS. 6-8) by means of a fixed base assembly 20, that includes a first interface flange 21 securely fixed to said satellite, and a preloading nut 22 coupled to the first segment 10a of the segmented tie rod 10; and
- a deployable antenna (not shown in FIGS. 6-8) by means of a deployable upper assembly 30, that
  - includes a second interface flange 31 securely fixed to said deployable antenna, and
  - is releasably jointed to the base structure 20 by means of separable conical joint 32.

The configuration involved in the example shown in FIGS. 6-8 is based on a toroidal magnetic circuit having the primary winding coaxial with the tie rod 10 and the axially symmetric external casing 12 all around.

The separable conical joint 32 is structurally connected to a main shaft and extractor 33, which is spliced into a sphere of a spherical joint 34 and is bolted to the second segment 10b of the segmented tie rod 10. Moreover, the first segment 10a is preloaded by means of the preloading nut 22.

An external casing of the spherical joint 34 is spliced into the second interface flange 31.

With specific reference to FIGS. 7 and 8, when the solder joint 11 has melted, the main shaft and extractor 33, together with the second segment 10b, are pushed away, by means of an extractor spring 35, up to get in contact with a protective cup 36 which prevents the main shaft and extractor 33 from being ejected far away. At this point, the separable conical joint 32 is no longer preloaded and, thence, the deployable upper assembly 30 can be deployed freely, while the fixed base assembly 20 remains fixed.

FIGS. 9-16 show further preferred embodiments of the present invention, which:
- involve, all, the use of the segmented tie rod 10 comprising the first and second segments 10a and 10b soldered to one another by means of the solder alloy forming the solder joint 11 therebetween; and
- differ from one another in the way in which the magnetic flux is induced into said segmented tie rod 10.

Figure 9:
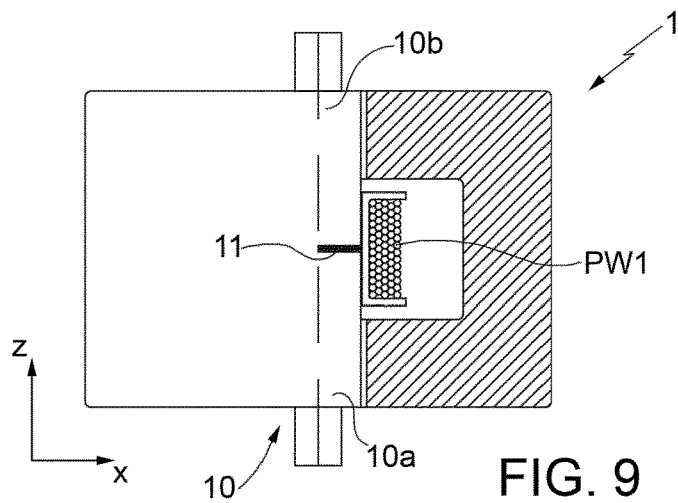
FIGS. 9-16 illustrate further preferred embodiments of the present invention.
Figure 10:
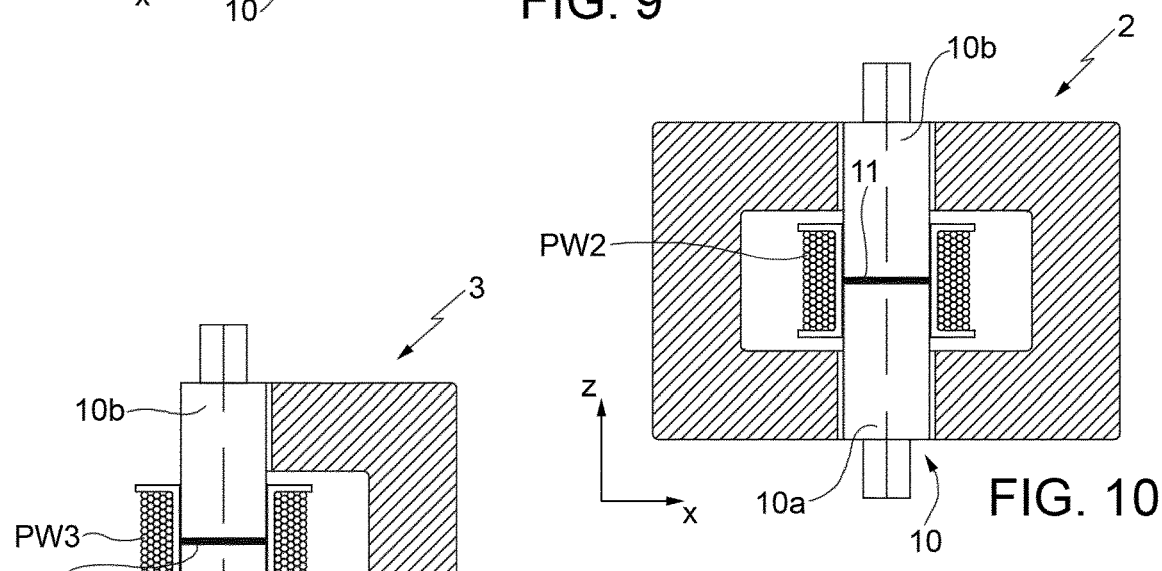
Figure 11:
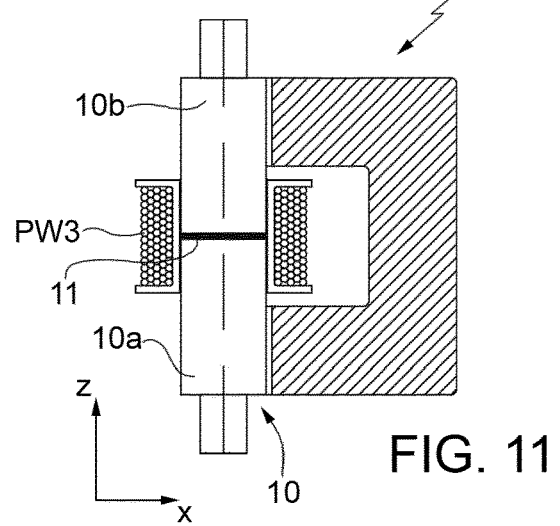
Figure 12:
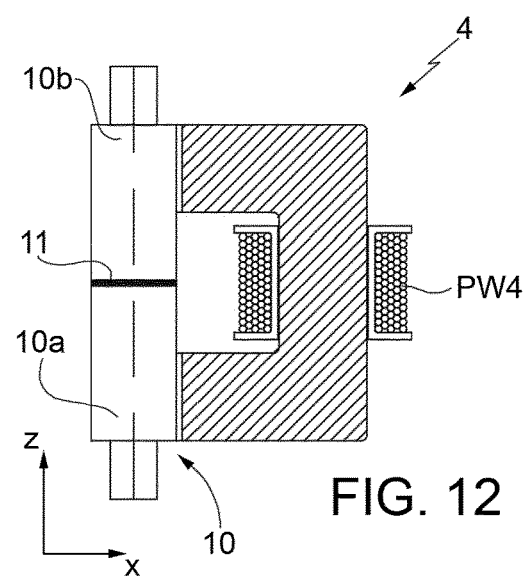
Figure 13:
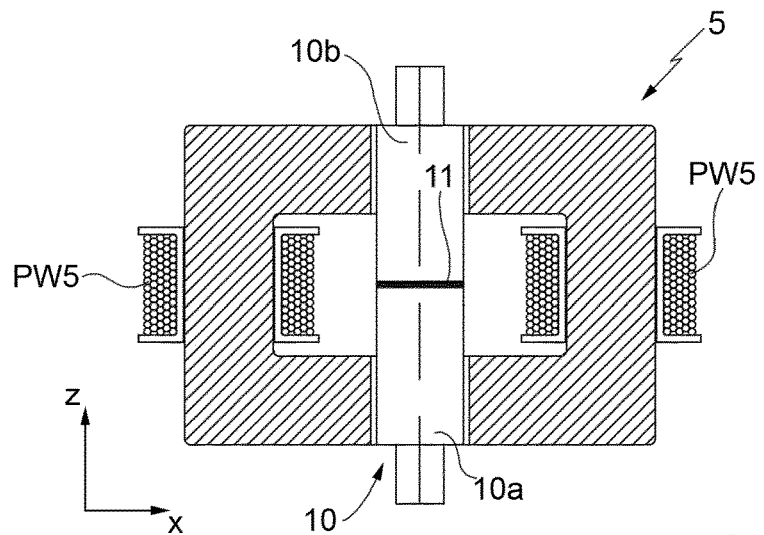
Figure 14:
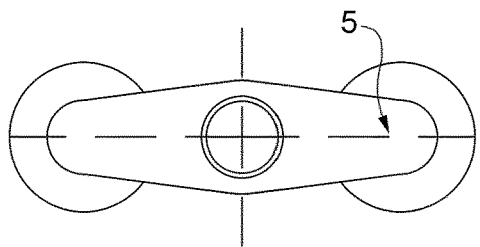
Figure 15:
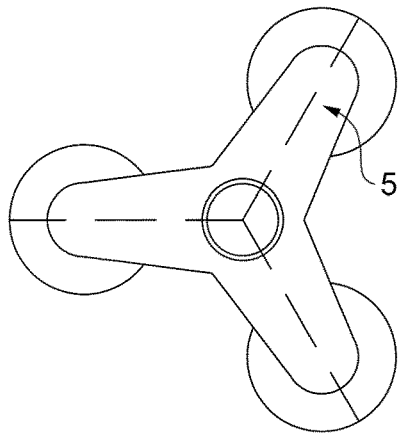
Figure 16:
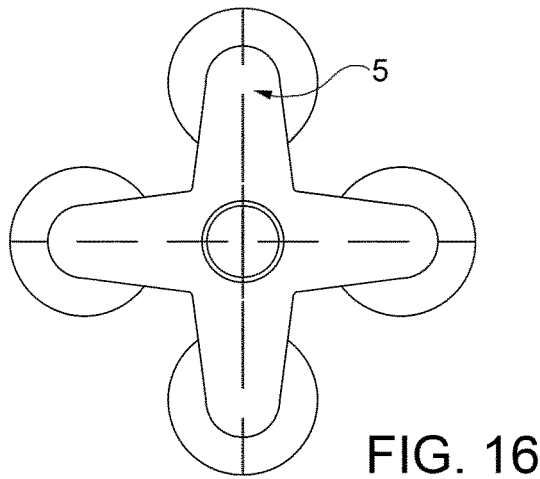

In particular, it can be noted that:
- FIG. 9 shows a cross-section, in the Cartesian reference plane zx, of the first release system 1 (also shown in FIGS. 1, 2 and 5-8), which has a toroidal, axially symmetric configuration with primary winding PW1 on axis (said primary winding PW1 being denoted in FIGS. 1, 2 and 5-8 as 13);
- FIG. 10 shows a cross-section, in the Cartesian reference plane zx, of a second release system (denoted as whole by 2) according to a second preferred embodiment of the present invention, wherein said second release system 2 has a planar symmetric configuration with primary winding PW2 on axis;
- FIG. 11 shows a cross-section, in the Cartesian reference plane zx, of a third release system (denoted as whole by 3) according to a third preferred embodiment of the present invention, wherein said third release system 3 has a planar asymmetric configuration with primary winding PW3 on axis;
- FIG. 12 shows a cross-section, in the Cartesian reference plane zx, of a fourth release system (denoted as whole by 4) according to a fourth preferred embodiment of the present invention, wherein said fourth release system 4 has a planar asymmetric configuration with primary winding PW4 off axis;
- FIG. 13 shows a cross-section, in the Cartesian reference plane zx, of a fifth release system (denoted as whole by 5) according to a fifth preferred embodiment of the present invention, wherein said fifth release system 5 has a N-branch symmetric configuration with primary windings PW5 off axis;
- FIGS. 14, 15 and 16 show top views of three examples of use of the fifth release system 5, in particular with reference to, respectively, a 2-branch symmetric configuration with primary windings PW5 off axis, a 3-branch symmetric configuration with primary windings PW5 off axis, and a 4-branch symmetric configuration with primary windings PW5 off axis.

From the foregoing description the technical advantages of the present invention are immediately clear.

In particular, it is important to point out that the release system according to the present invention can fully cover the preload and temperature ranges required for this kind of devices (i.e., respectively, [0 N,150 kN] and [−130° C.,+150° C.]).

Moreover, the release system according to the present invention induces only ultralow shocks, because the separation of the segments of the segmented structural element is very soft due to the fact the it is generated by a melting process, while residual shock, which is only due to preloading strain energy, can be easily managed by dedicated design at HRM level.

Additionally, the release system according to the present invention does not produce any debris, thereby meeting ESA's space debris mitigation requirements.

Furthermore, the present invention overcomes any export control restriction issue, since it based on technologies fully owned by the Applicant.

Figure 17:
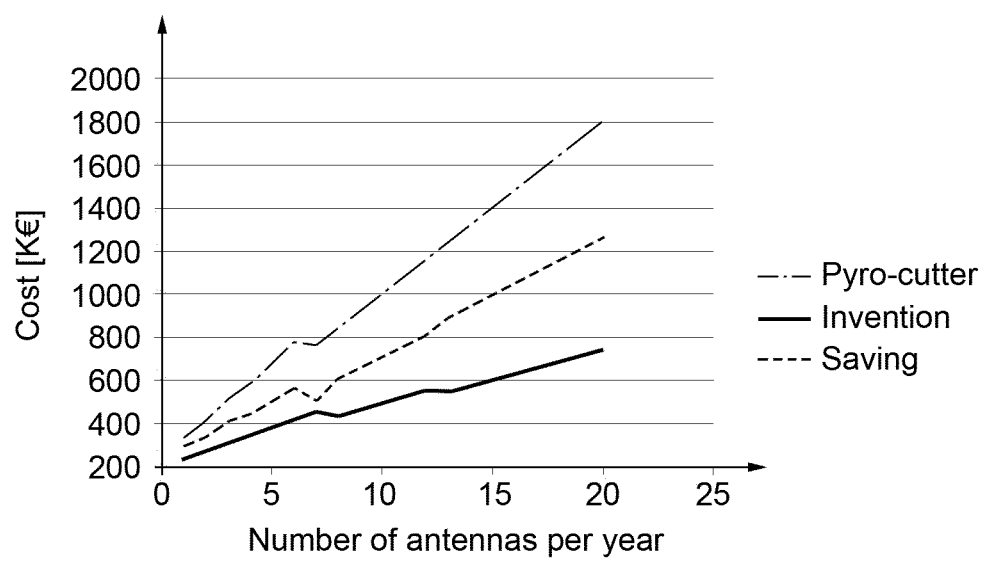
FIG. 17 shows a comparison between the costs of a standard pyro-cutter and of the release system according to the present invention.

Besides the above advantages, it is worth noting also that the release system according to the present invention allows to achieve a remarkable cost saving with respect to pyrotechnic actuators. In this respect, FIG. 17 shows a comparison between the costs of a standard pyro-cutter and of the release system according to the present invention as a function of the number of deployable antennas for satellites produced per year (taking into consideration the use of four HRMs for each antenna).

To sum up, the present invention provides the following key features:
- non-explosive;
- almost zero shock;
- very high preload;
- wide operating temperature ranges;
- mechanically simple;
- low mass;
- unlimited shelf and in-orbit life;
- low cost;
- no debris;
- no export control restrictions;
- resettable by tie rod replacing as well as for the current HRMs.

Finally, it is important to stress again the point that the present invention, in addition to HRM applications, can be advantageously exploited also to:
- achieve fragmentation of end-of-life space systems to meet space debris control regulations; and restrain during launch and then release in orbit a satellite or spacecraft carried by a launch vehicle (for example from the launcher upper stage in place of the standard Marman clamp).

In conclusion, it is clear that numerous modifications and variants can be made to the present invention, all falling within the scope of the invention, as defined in the appended claims.

The invention claimed is:

1. A release system, comprising:
    a segmented structural element including a first segment designed to be coupled to a first structure, and a second segment designed to be coupled to a second structure;
    a solder joint joining respective ends of said first and second segments, thus holding down the first and second structures with respect to one another; wherein said solder joint is electromagnetically heatable and includes a solder alloy having a predefined melting temperature; and
    magnetic field generating means configured to, upon reception of a release command, generate a time-varying magnetic field through the solder joint to cause heating thereof up to the predefined melting temperature of the solder alloy, thereby causing melting of said solder alloy and separation of the first and second segments, enabling release of the first and second structures from one another;
    wherein at least one of the first segment or the second segment is preloaded by a force such that when the solder alloy is melted, the first and second segments are biased away from each other by the force to assist with separation of the first and second segments.

2. The release system of claim 1, wherein the solder alloy is an eutectic alloy.

3. The release system according to claim 1, wherein the solder alloy is electromagnetically heatable; wherein the solder joint is made up of said solder alloy; and wherein the magnetic field generating means are configured to generate a time-varying magnetic field through the solder joint such that to induce eddy currents in said solder alloy, thereby causing heating thereof up to said predefined melting temperature.

4. The release system according to claim 1, wherein the solder joint further includes a metal; and wherein the magnetic field generating means are configured to generate a time-varying magnetic field through the solder joint such that to induce eddy currents in said metal, thereby causing heating thereof; whereby the heating of said metal causes the solder alloy to heat up to its predefined melting temperature.

5. The release system of claim 4, wherein the solder joint includes:
    two layers made of the solder alloy; and
    a layer that is made of said metal and is interposed between said two layers made of the solder alloy.

6. The release system according to claim 4, wherein said metal is copper.

7. T The release system according to claim 1, wherein the solder alloy is a gold or silver alloy.

8. T The release system according to claim 1, wherein the predefined melting temperature is comprised between 200° C. and 400° C.

9. T The release system according to claim 1, wherein the solder alloy is characterized by a mechanical strength higher than 100 MPa.

10. The release system according to claim 1, wherein the segmented structural element extends mainly along a longitudinal axis; wherein the solder joint has a substantially uniform cross-sectional size orthogonally to said longitudinal axis, and a thickness along said longitudinal axis smaller than said cross-sectional size; and wherein the magnetic field generating means are designed to generate a time-varying magnetic field extending through the solder joint substantially parallelly to said longitudinal axis.

11. The release system according to claim 1, wherein the segmented structural element is made of a soft magnetic alloy.

12. The release system of claim 11, wherein said soft magnetic alloy includes pure iron, or is a silicon-iron or cobalt-iron alloy.

13. The release system according to claim 1, further including an soft-magnetic casing housing the segmented structural element.

14. The release system of claim 13, wherein said soft-magnetic casing is made of a soft magnetic alloy, that includes pure iron, or is a silicon-iron or cobalt-iron alloy.

15. The release system according to claim 1, wherein the magnetic field generating means include a coil connected to an alternating current generator to be supplied thereby.

16. A space system equipped with the release system claimed in claim 1.

17. The space system of claim 16, wherein said space system is a satellite or a spacecraft equipped with a deployable appendage or apparatus; and wherein said first and second segments of the segmented structural element of the release system are coupled to, respectively, said satellite or spacecraft and said deployable appendage or apparatus.

18. The space system of claim 16, wherein said space system is a launch vehicle designed to carry a satellite or a spacecraft; and wherein said first and second segments of the segmented structural element of the release system are coupled to, respectively, said launch vehicle and said satellite or spacecraft.

19. The space system of claim 16, wherein said space system is a satellite or spacecraft or launch vehicle designed to fragment before or during re-entry into the Earth's atmosphere; and wherein said first and second segments of the segmented structural element of the release system are coupled to, respectively, a first component/apparatus and a second component/apparatus of said satellite spacecraft, or launch vehicle.

20. The release system of claim 1, wherein the force is provided by an extractor spring configured to push the first and second segments apart.

* * * * *